United States Patent
Hashiguchi et al.

(10) Patent No.: US 8,270,829 B2
(45) Date of Patent: Sep. 18, 2012

(54) APPARATUS AND METHOD FOR DESIGNING NETWORK

(75) Inventors: Tomohiro Hashiguchi, Kawasaki (JP); Toru Katagiri, Kawasaki (JP); Kazuyuki Tajima, Kawasaki (JP); Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 528 days.

(21) Appl. No.: 12/618,913

(22) Filed: Nov. 16, 2009

(65) Prior Publication Data
US 2010/0166421 A1 Jul. 1, 2010

(30) Foreign Application Priority Data
Dec. 25, 2008 (JP) .................................. 2008-329253

(51) Int. Cl.
*H04B 10/08* (2006.01)
(52) U.S. Cl. ................. 398/34; 398/25; 398/26; 398/29; 398/79; 398/38; 398/147; 398/81; 398/58
(58) Field of Classification Search .................. 398/34, 398/35, 38, 79, 25, 26, 29, 27, 33, 58, 43, 398/45, 48, 158, 159, 147, 81
See application file for complete search history.

(56) References Cited

U.S. PATENT DOCUMENTS
7,415,208 B1 * 8/2008 Haggans et al. ................ 398/57
7,941,047 B2 * 5/2011 Zhou et al. ...................... 398/15

FOREIGN PATENT DOCUMENTS
JP 2004-048477 A 2/2004
* cited by examiner

*Primary Examiner* — Hanh Phan
(74) *Attorney, Agent, or Firm* — Fujitsu Patent Center

(57) ABSTRACT

In a network design apparatus, a full channel evaluator determines whether all wavelength channels for main signals can deliver the main signals of an existing optical network. When it is found that one or more wavelength channels cannot deliver main signals, a chromatic dispersion evaluator determines whether there are a specified number of wavelength channels that satisfy a specified chromatic dispersion condition. An optical signal-to-noise ratio (SNR) evaluator extracts a specified number of wavelength channels out of those satisfying the chromatic dispersion condition in descending order of optical SNRs thereof, and determines whether the extracted wavelength channels satisfy a specified optical SNR condition.

13 Claims, 13 Drawing Sheets

APPARATUS AND METHOD FOR DESIGNING NETWORK

CROSS-REFERENCE TO RELATED APPLICATION(S)

This application is based upon and claims the benefit of priority of the prior Japanese Patent Application No. 2008-329253, filed on Dec. 25, 2008, the entire contents of which are incorporated herein by reference.

FIELD

The embodiments discussed herein relate to a network design apparatus and method for providing additional wavelength paths in an existing optical network.

BACKGROUND

Optical add-drop multiplexers (OADM) and optical hubs (or wavelength cross-connect) enable dropping, adding, or switching optical signals on an individual wavelength basis, without the need for converting them into electric signals. Recent wavelength-division multiplexed (WDM) optical networks use those all-optical network devices to provide interconnections in ring, mesh, and other complicated topologies. There is, accordingly, a growing need for techniques to optimize an increasingly complex network design.

In the process of designing a WDM optical network, a network design apparatus is used to, for example, create a layout of communication devices and set up a route of demand traffic. During this course, simulation tools are used to determine whether all WDM channels can deliver signals, while the network may not necessarily need all of them.

FIG. 13 illustrates determination of whether every wavelength channel can deliver signals. For example, a network design apparatus is used to design an optical network that conveys main signal traffic at the rate of 10 Gbps. FIG. 13 illustrates a full set of WDM main signals with wavelengths of $\lambda 1$ to $\lambda n$. The network design apparatus tests each of those signals to determine whether they can all deliver signals. While not all those wavelength channels are necessary to implement 10-Gbps signal transmission, the network design apparatus determines that it is not possible to realize the desired network if even a single wavelength channel is found incapable of delivering a signal properly.

Suppose now that the above 10-Gbps optical network is to be expanded to a 40-Gbps network. This means that new wavelength paths will be added to the existing 10-Gbps network. The network design apparatus determines whether all wavelength channels can deliver signals, similarly to the foregoing case of 10 Gbps. This determination for the purpose of 40-Gbps expansion is performed on the same full set of wavelength channels as in the case of the 10-Gbps optical network.

As described above, the network design apparatus has once determined in the 10-Gbps network design that all wavelength channels can deliver signals. This may not necessarily mean that the same set of wavelength channels can work similarly in the 40-Gbps design; some wavelength channels may be found incapable of delivering signals properly.

When it is determined that all wavelength channels can be used for the 40-Gbps design, the network design apparatus selects wavelength channels that are not used in the existing 10-Gbps optical network and assigns them to the network as its additional channels. For example, the network design apparatus selects optical paths from the unused wavelength channels in FIG. 13 and adds them to the existing optical network. This operation makes it possible to expand an optical network from, for example, 10 Gbps to 40 Gbps. When, on the other hand, there is even a single wavelength channel that cannot deliver signals, the network design apparatus finds it impossible to expand the existing optical network to 40 Gbps, in spite of the presence of usable wavelength channels.

For example, Japanese Laid-open Patent Publication No. 2004-048477 proposes a network design apparatus which determines whether signals can be delivered or not, based on normalized noise levels. The proposed apparatus normalizes beforehand the amount of noise produced in each node, as well as the tolerance thereto, according to segment type, segment loss, and the number of wavelengths.

As can be seen from the above discussion, the conventional network design method is unable to provide a solution to expand an existing optical network in the case where an incapable wavelength channel is included in the full set of wavelength channels, even though other wavelength channels can deliver signals.

SUMMARY

According to an aspect of the invention, there is provided a network design apparatus to add new wavelength paths to an existing optical network. This network design apparatus includes the following elements: a full channel evaluator to determine whether all wavelength channels for main signals can deliver the main signals of the optical network; a chromatic dispersion evaluator to determine whether there are a specified number of wavelength channels that satisfy a specified chromatic dispersion condition, when it is found that one or more wavelength channels cannot deliver main signals; and an optical signal-to-noise ratio (SNR) evaluator to extract a specified number of wavelength channels out of those satisfying the chromatic dispersion condition in descending order of optical SNRs thereof, and to determine whether the extracted wavelength channels satisfy a specified optical SNR condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Figure 1:
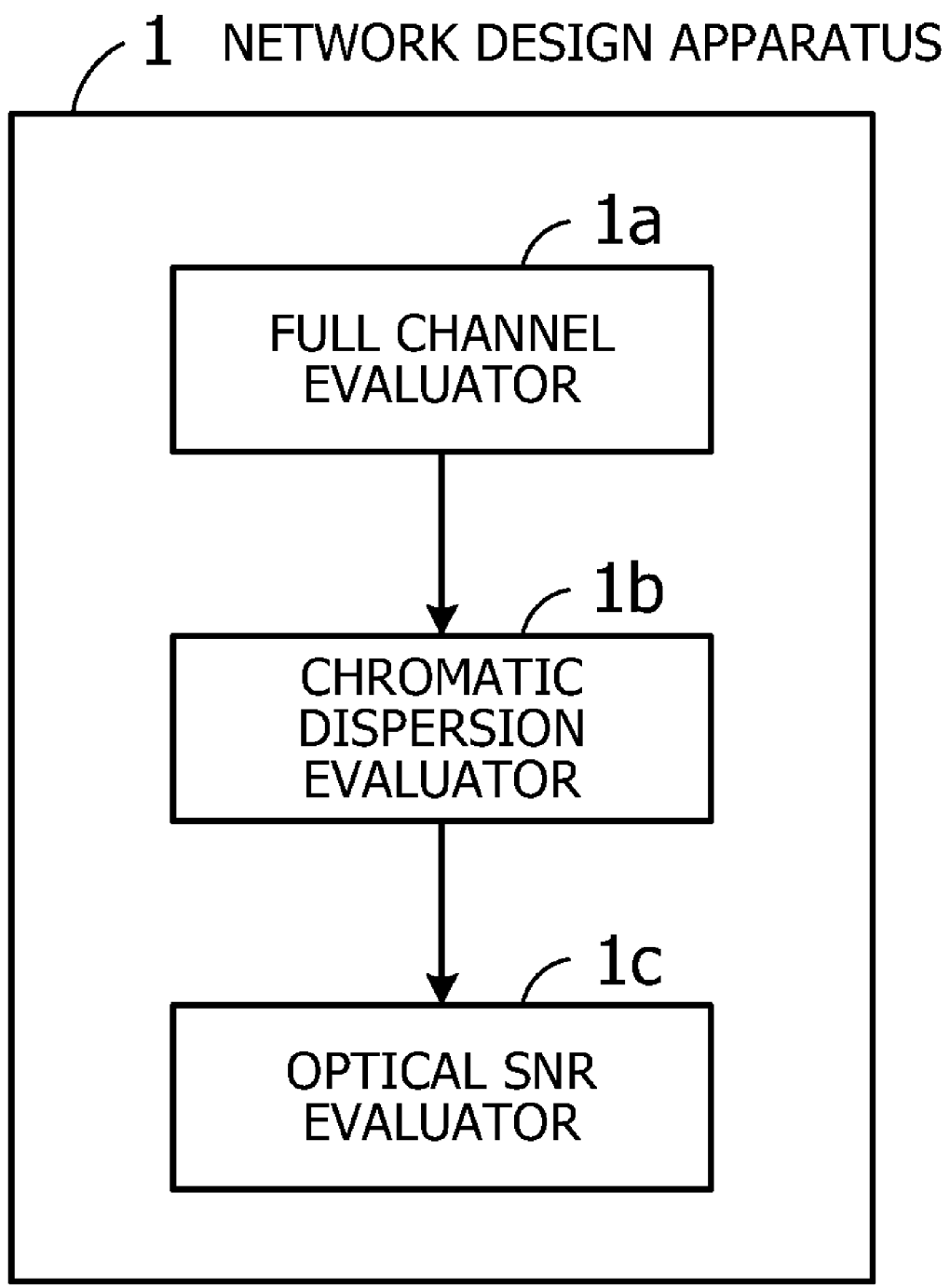
FIG. 1 illustrates a network design apparatus according to an embodiment of the invention.

Embodiments of the present invention will now be described in detail below with reference to the accompanying drawings, wherein like reference numerals refer to like elements throughout.

FIG. 1 illustrates a network design apparatus according to an embodiment of the invention. The illustrated network design apparatus 1 is used to add new wavelength paths to an existing optical network. To this end, the network design apparatus 1 includes a full channel evaluator 1a, a chromatic dispersion evaluator 1b, and an optical signal-to-noise ratio (SNR) evaluator 1c.

The full channel evaluator 1a determines whether all wavelength channels can deliver main WDM signals of the optical network. If there is even a single wavelength channel that does not deliver a signal, the full channel evaluator 1a determines that not all wavelength channels can deliver signals. If this is the case, the chromatic dispersion evaluator 1b then determines whether there are a specified number of wavelength channels that satisfy a specified chromatic dispersion condition. For example, the chromatic dispersion evaluator 1b determines whether there are as many such wavelength channels as the number of required wavelength paths to expand the optical network.

The optical SNR evaluator 1c extracts a specified number of wavelength channels from those satisfying the chromatic dispersion condition in descending order of their optical SNRs. The optical SNR evaluator 1c then determines whether the extracted wavelength channels satisfy a specified optical SNR condition. For example, the optical SNR evaluator 1c extracts as many wavelength channels as the number of required wavelength paths to expand the optical network, from those satisfying the chromatic dispersion condition in descending order of their optical SNRs. If the extracted wavelength channels satisfy the optical SNR condition, it means that they satisfy both the specified chromatic dispersion condition and optical SNR, thus making it possible to provide a feasible network design even though not all wavelength channels can deliver signals.

As can be seen from the above description, the proposed network design apparatus 1 determines whether there are a specified number of wavelength channels that satisfy a chromatic dispersion condition when it is not possible to use all wavelength channels. The network design apparatus 1 extracts a specified number of such wavelength channels in descending order of their optical SNRs and then determines whether the extracted wavelength channels satisfy a specified optical SNR condition. Even though not all wavelength channels can deliver signals, the network design apparatus 1 can offer a feasible solution of additional wavelength paths for an existing optical network as long as there are a sufficient number of wavelength channels satisfying given conditions of chromatic dispersion and optical SNR.

Figure 2:
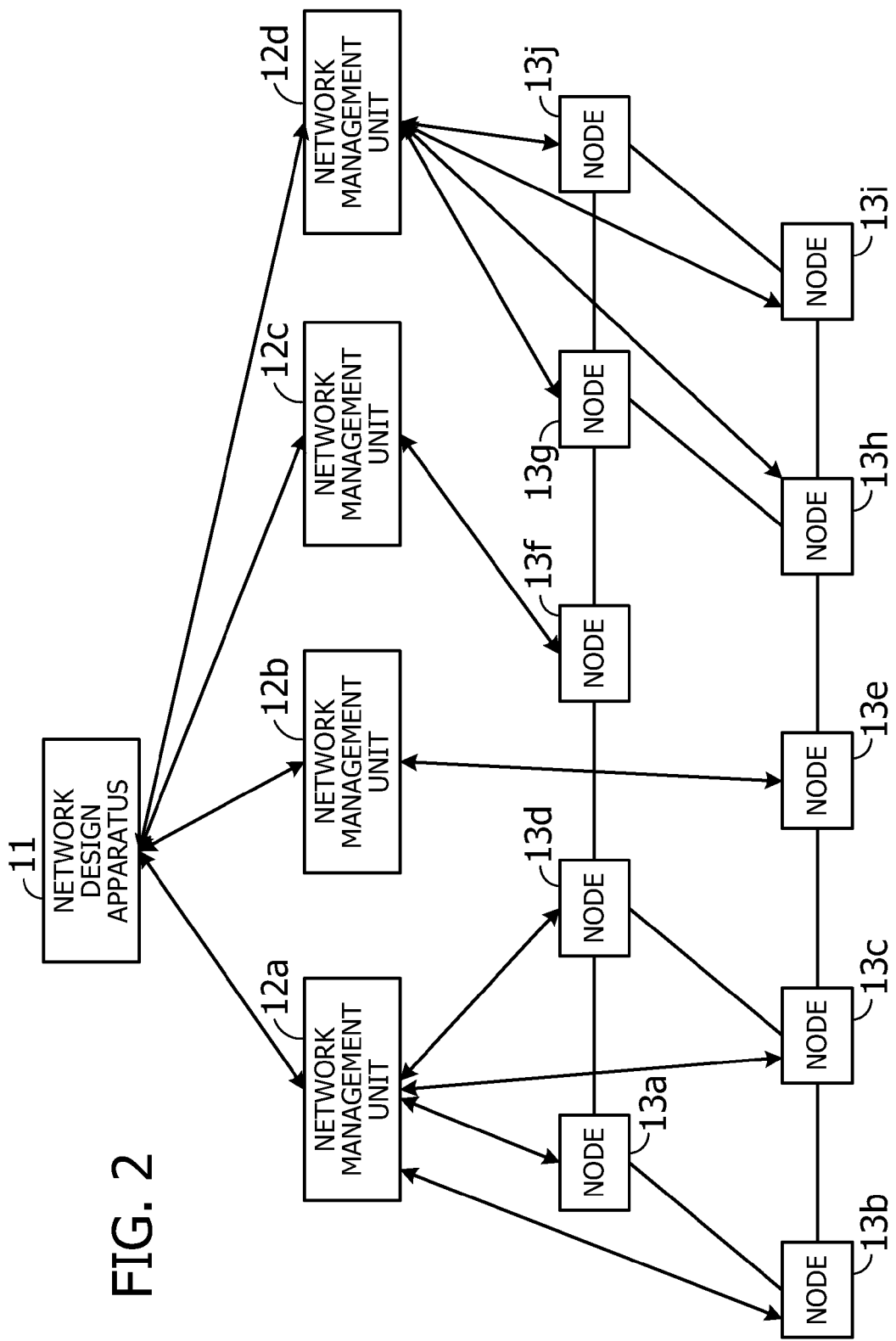
FIG. 2 illustrates an example of an optical network design system.

A specific embodiment will now be described in detail below. FIG. 2 illustrates an example of an optical network design system. In the illustrated system, a network design apparatus 11 is connected to a plurality of network management units 12a to 12d. One network management unit 12a is connected to nodes 13a to 13d. Another network management unit 12b is connected to a node 13e. Yet another network management unit 12c is connected to a node 13f. Still another network management unit 12d is connected to nodes 13g to 13j.

Those nodes 13a to 13j may be, for example, OADMs, optical hubs, or inline amplifiers (ILAs), which constitute a Synchronous Optical Network (SONET) or Synchronous Digital Hierarchy (SDH) system. While not depicted in FIG. 2, each node 13a to 13j includes an element management system (EMS) to communicate with the network management units 12a to 12d.

The network management units 12a to 12d manage optical networks formed from such nodes 13a to 13j. For example, one network management unit 12a manages an optical network formed from nodes 13a to 13d. While not depicted in FIG. 2, each network management unit 12a to 12d includes a network management system (NMS) to communicate with the network design apparatus 11 and node 13a to 13j.

The network design apparatus 11 enables expansion of an existing optical network through the use of simulation programs. For example, the network design apparatus 11 offers an upgrade design for an existing 10-Gbps optical network so that its bandwidth will be expanded to 40-Gbps.

The network design apparatus 11 communicates with the NMS in each network management unit 12a to 12d, via which some factual data of the optical network (e.g., optical power level and bit error rate (BER) of each node 13a to 13j) can be collected. The network design apparatus 11 may use the collected factual data in designing expansion of the optical network. Applications of the network design apparatus 11 is, however, not limited to such expansion design, but the network design apparatus 11 can also be used to build a new optical network.

Suppose now that the nodes 13a to 13j in FIG. 2 constitute an optical network with a bandwidth of 10 Gbps and that the network design apparatus 11 is used to increase the bandwidth from 10 Gbps to 40 Gbps. The network design apparatus 11 is used to add new wavelength paths to the existing 10-Gbps optical network so as to expand it to a 40-Gbps optical network.

The network design apparatus 11 examines configuration of the 10-Gbps optical network to determine whether all wavelength channels can deliver signals when they are used in the 40-Gbps version. When every wavelength channel is found capable of delivering signals, the network design apparatus 11 selects a set of wavelength channels from among those not used in the existing 10-Gbps optical network and assigns them to its new wavelength paths, thus completing the design.

When it is found not possible to use all wavelength channels (i.e., when there is included a wavelength channel that cannot deliver signals properly), the network design apparatus 11 extracts usable wavelength channels from among the full set of wavelength channels. For example, the network design apparatus 11 extracts a specified number of wavelength channels that satisfy some requirements as to their chromatic dispersion and optical signal-to-noise ratio (OSNR).

When it is not possible to extract as many usable wavelength channels as specified, the network design apparatus 11 collects factual data of the existing optical network. The network design apparatus 11 uses the collected factual data to update parameters that have previously been entered for design purposes. With those updated design parameters, the network design apparatus 11 tries again to extract usable wavelength channels. That is, the network design apparatus 11 evaluates the transmission capabilities of individual wavelength channels, based not merely on the parameters obtained through simulation, but on the actual measurements collected from the optical network, in an attempt to discover additional wavelength channels that can deliver signals.

Even with the factual data of the optical network, it may still not be possible to extract a sufficient number of usable wavelength channels. In that case, the network design apparatus 11 adjusts optical power levels of the nodes 13a to 13j (if they are adjustable) and makes another try. The network design apparatus 11 now uses integer programming techniques to solve the problem of how to combine optical power levels at different nodes. That is, the network design apparatus 11 attempts to discover additional usable wavelength channels by changing optical power levels at the nodes 13a to 13j.

As can be seen from the above description, the proposed network design apparatus 11 extracts usable wavelength channels that can deliver signals in an attempt to provide the existing optical network with as many additional wavelength paths as possible, even when not all wavelength channels are usable.

Figure 3:
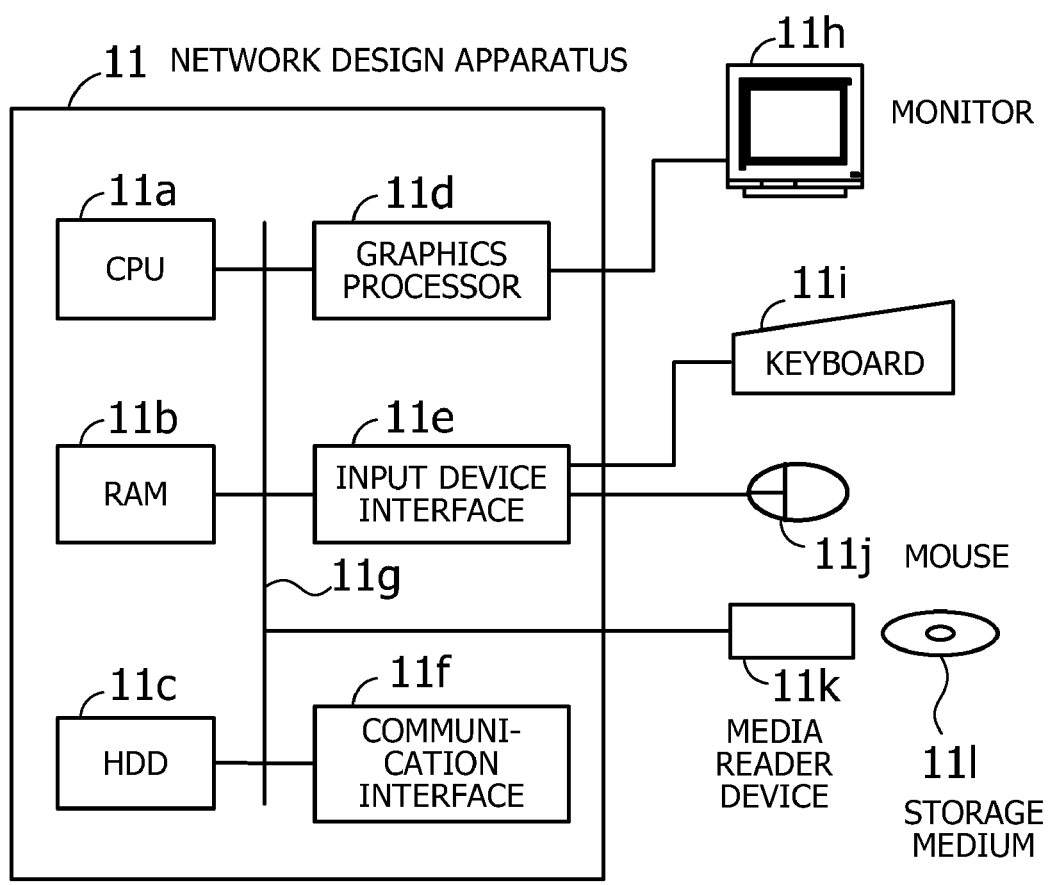
FIG. 3 is a hardware block diagram of a network design apparatus.

FIG. 3 is a hardware block diagram of a network design apparatus. The illustrated network design apparatus 11 has the following components: a central processing unit (CPU) 11a, a random access memory (RAM) 11b, a hard disk drive (HDD) 11c, a graphics processor 11d, an input device interface 11e, and a communication interface 11f. The CPU 11a controls the entire system of the network design apparatus 11, interacting with other components via a bus 11g.

The RAM 11b serves as temporary storage for the whole or part of operating system (OS) programs and application programs that the CPU 11a executes, in addition to other various data objects manipulated at runtime. The HDD 11c stores installed files of operating system programs and simulation programs for use in optical network design.

The graphics processor 11d produces video images in accordance with drawing commands from the CPU 11a and displays them on the screen of a monitor 11h coupled thereto. The input device interface 11e receives signals from external input devices, such as a keyboard 11i and a mouse 11j. Such input signals are supplied to the CPU 11a via the bus 11g.

A storage medium 11l, such as a compact disc read-only memory (CD-ROM), is used to store simulation programs and other computer files. A media reader device 11k is used to read the program and data files out of the storage medium 11l and supply them to the CPU 11a via the bus 11g. Those files may be installed in the HDD 11c.

While not depicted in FIG. 3, the communication interface 11f is connected to network management units 12a to 12d so as to allow the CPU 11a to communicate with them.

Figure 4:
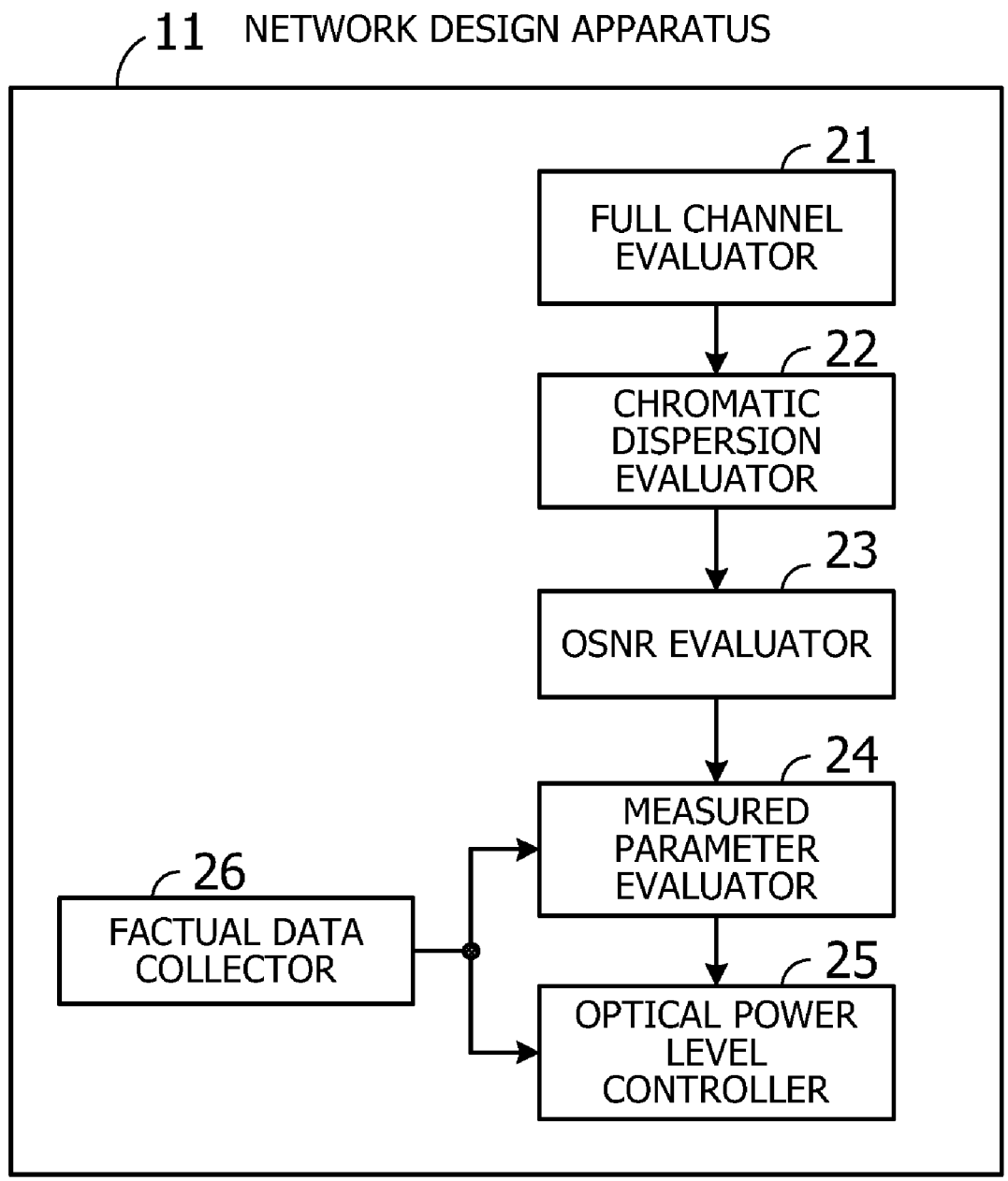
FIG. 4 is a functional block diagram of a network design apparatus.

FIG. 4 is a functional block diagram of a network design apparatus. The illustrated network design apparatus 11 includes a full channel evaluator 21, a chromatic dispersion evaluator 22, an OSNR evaluator 23, a measured parameter evaluator 24, an optical power level controller 25, and a factual data collector 26.

The full channel evaluator 21 divides an existing optical network into minimum regenerator sections for the purpose of subsequent processing to add new wavelength paths. The term "minimum regenerator section" refers to a minimum-distance section of a WDM optical network to which an optical regenerator device can be inserted.

Figure 5:
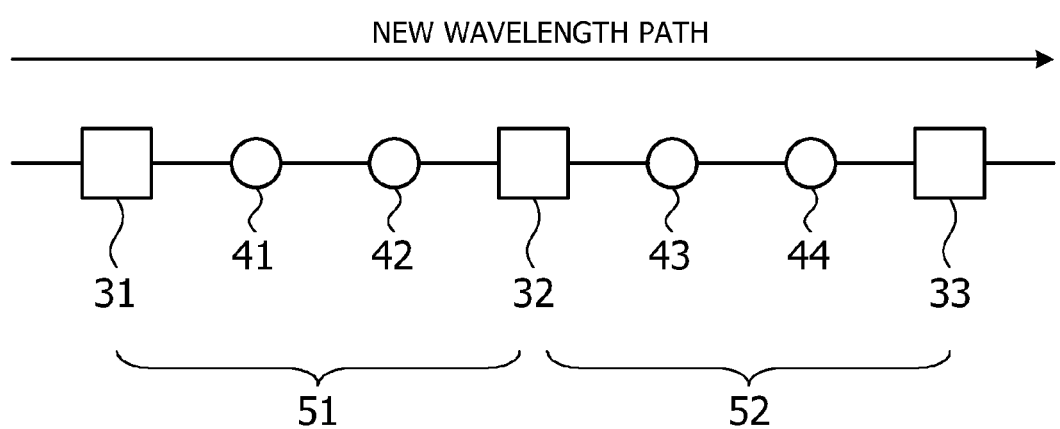
FIG. 5 illustrates minimum regenerator sections.

FIG. 5 illustrates minimum regenerator sections. The illustrated network path includes OADMs 31 to 33 and ILAs 41 to 44. Regenerators may be installed in the same buildings as where the OADMs 31 to 33 are installed. Accordingly, the portions indicated by the reference numerals 51 and 52 are minimum regenerator sections in the illustrated case. The full channel evaluator 21 determines whether all wavelength channels in each minimum regenerator section 51 and 52 can deliver signals. When all wavelength channels are found capable of delivering signals, the full channel evaluator 21 selects a specified number of wavelength channels from those not used in the existing optical network and assigns them to the network as additional channels. The described process makes it possible to expand an optical network from, for example, 10 Gbps to 40 Gbps.

Figure 6:
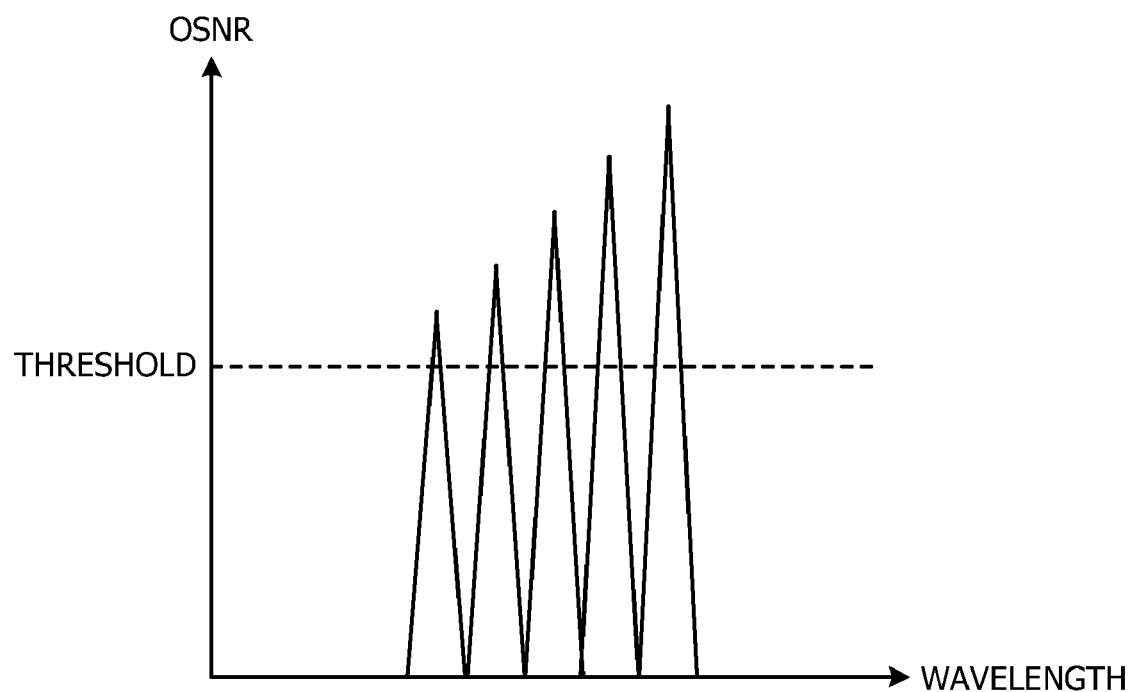
FIGS. 6 and 7 are first and second diagrams illustrating how a full channel evaluator determines whether it is possible to deliver signals.

FIG. 6 is a first diagram illustrating how the full channel evaluator 21 determines whether it is possible to deliver signals. Specifically, the full channel evaluator 21 calculates OSNR of each wavelength channel through a simulation based on a given set of design parameters. This calculation is performed for each of the divided minimum regenerator sections. The full channel evaluator 21 examines the calculated OSNRs of wavelength channels to determine whether they exceed a specified threshold, as illustrated in FIG. 6. If there is even a single wavelength channel whose OSNR does not exceed the threshold, the full channel evaluator 21 finds that not all wavelength channels can deliver signals. It is noted that the threshold illustrated in FIG. 6 may vary from design to design. For example, 40-Gbps wavelength paths have a larger threshold than that of 10-Gbps wavelength paths. It is also noted that the full channel evaluator 21 may introduce other criteria to qualify wavelength channels, rather than relying simply on OSNR. For example, the full channel evaluator 21 may compare OSNR of received signals with a threshold, taking into consideration their deterioration due to various transmission penalties.

Figure 7:
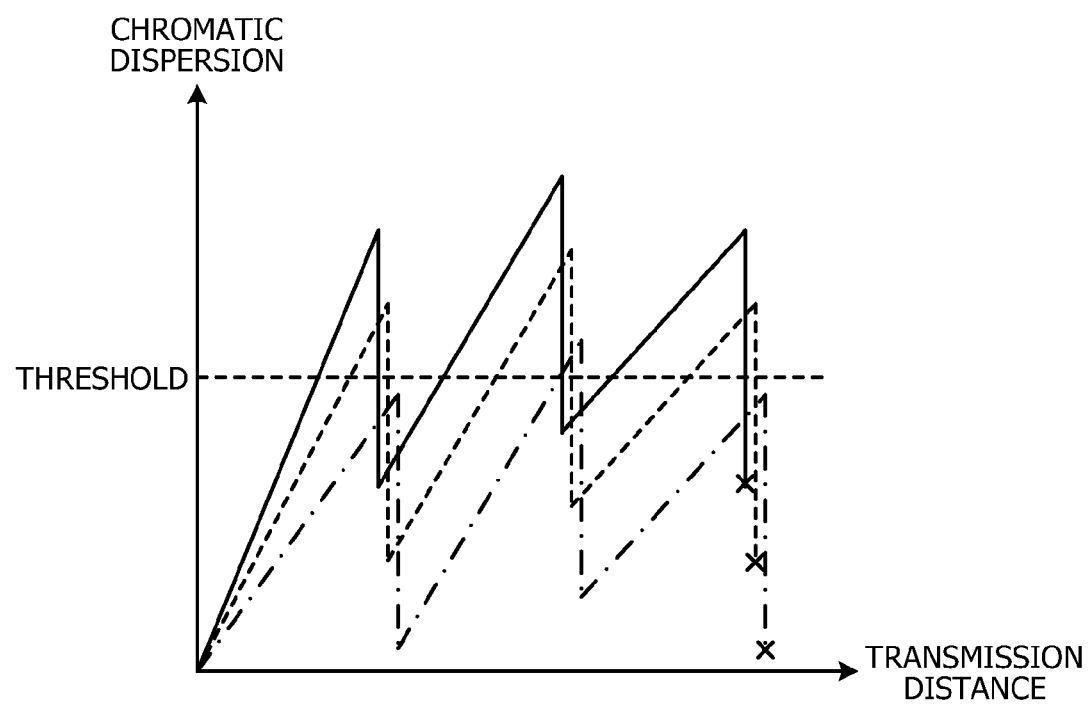

FIG. 7 is a second diagram illustrating how the full channel evaluator 21 determines whether it is possible to deliver signals. Specifically, FIG. 7 depicts chromatic dispersion of three WDM signals propagating over a minimum regenerator section, as indicated by the solid line, dotted line, and dash-and-dot line. These WDM signals have different wavelengths and thus experience chromatic dispersion in different ways during their travel through the optical fiber medium. Such chromatic dispersion is cancelled by intermediate devices or repeaters placed along the path. It is noted in FIG. 7 that the threshold of chromatic dispersion may vary. For example, 40-Gbps wavelength paths have a larger threshold than that of 10-Gbps wavelength paths.

The full channel evaluator 21 calculates chromatic dispersion of every wavelength channel in each minimum regenerator section through simulation based on a given set of design parameters. The full channel evaluator 21 determines whether the calculated chromatic dispersion of each wavelength channel exceeds a specified threshold. If even a single wavelength channel exhibits an excessive chromatic dispersion, the full channel evaluator 21 determines that not all wavelength channels can deliver signals.

When all wavelength channels satisfy both conditions on their OSNR and chromatic dispersion, the full channel evaluator 21 determines that the full set of wavelength channels can deliver signals properly. When the wavelength channels fail to satisfy either one or both of the two conditions, the full channel evaluator 21 determines that not all wavelength channels can deliver signals properly. It is noted that some safety margin may be added to the above-described thresholds of chromatic dispersion and OSNR.

In the case where the full channel evaluator 21 has determined that not all wavelength channels can deliver signals properly, the chromatic dispersion evaluator 22 determines whether all wavelength channels satisfy the chromatic dispersion condition. If they do not, the chromatic dispersion evaluator 22 extracts wavelength channels satisfying the chromatic dispersion condition from the full set of wavelength channels. The chromatic dispersion evaluator 22 then compares the number of extracted satisfactory wavelength channels with the number of required wavelength paths. That is, the chromatic dispersion evaluator 22 determines whether there exist at least as many wavelength channels satisfying the chromatic dispersion condition as required to expand the optical network to 40 Gbps. If the extracted wavelength channels do not reach the number of required wavelength paths, the chromatic dispersion evaluator 22 concludes that the planned expansion of the optical network is not possible, thus terminating the design process.

In the case where the chromatic dispersion evaluator 22 has found that all wavelength channels satisfy the chromatic dispersion condition, the OSNR evaluator 23 determines whether all those wavelength channels also satisfy the OSNR condition. Further, in the case where the chromatic dispersion evaluator 22 has found and extracted a specified number of wavelength channels satisfying the chromatic dispersion condition, the OSNR evaluator 23 determines whether all the extracted wavelength channels also satisfy the OSNR condition.

When it is found that all wavelength channels satisfy both the chromatic dispersion condition and OSNR condition, the OSNR evaluator 23 extracts a specified number of wavelength channels from the full set of wavelength channels (i.e., as many wavelength channels as the number of additional optical paths required to expand the optical network) and assigns the extracted wavelength channels to the optical network, thus completing the design. The OSNR evaluator 23 similarly extracts a specified number of wavelength channels from those that have been extracted because of their satisfactory chromatic dispersion when all the latter wavelength channels have been found to satisfy the OSNR condition. The OSNR evaluator 23 then assigns the extracted wavelength channels to the optical network, thus completing the design.

When it is found that all wavelength channels satisfy the chromatic dispersion condition but not the OSNR condition, the OSNR evaluator 23 extracts as many wavelength channels as the number of required optical paths in descending order of OSNR. When it is found that not all the wavelength channels satisfying the chromatic dispersion condition satisfy the OSNR condition, the OSNR evaluator 23 extracts as many wavelength channels as the number of required optical paths in descending order of OSNR. The OSNR evaluator 23 then determines whether all the extracted wavelength channels satisfy the OSNR condition. If so, the OSNR evaluator 23 assigns the entire set of the extracted wavelength channels to the optical network, thus completing the design.

In the case where the chromatic dispersion evaluator 22 and OSNR evaluator 23 are unable to extract as many usable wavelength channels as the number of required wavelength paths, the measured parameter evaluator 24 receives factual data of the optical network from the factual data collector 26. The factual data includes, for example, optical power levels of transmitted signals, which can be used to calculate net loss of those signals in each fiber span (i.e., each section of the optical fiber link divided by optical hubs, OADMs, ILAs, and the like).

The factual data collector 26 collects factual data (e.g., optical power levels and BER) of the optical network from its constituent nodes 13a to 13j. The measured parameter evaluator 24 updates given design parameters representing the amount of loss of optical fiber spans, based on the measured optical power levels. The measured parameter evaluator 24 then performs a simulation to calculate OSNR of wavelength channels that have been extracted in descending order of OSNR. The measured parameter evaluator 24 determines whether the calculated OSNR of those wavelength channels satisfies the OSNR condition (i.e., greater than a specified threshold). If so, the measured parameter evaluator 24 assigns the wavelength channels to the optical network, thus completing the design.

There may be some differences between the initially assumed design parameters and the real-world values observed as factual data of the optical network. Accordingly, the measured parameter evaluator 24 re-evaluates wavelength channels based on the factual data with respect to the specified OSNR condition, thereby salvaging wavelength channels that can actually be used to deliver signals.

In the case where the measured parameter evaluator 24 has failed to find a sufficient number of usable wavelength channels, the optical power level controller 25 divides the optical network into unit design sections. The term "unit design section" refers to a section of an optical network which is delimited by terminating stations of an optical path or by the stations having three or more neighboring stations. The former stations are, for example, such stations that accommodates an OADM device. Some OADM stations lack a wavelength path termination and may only accommodate a regenerator device for regenerative repeating. Such OADM stations can also serve as the delimiting points of a unit design section. The latter stations (i.e., stations having three or more neighboring stations) are, for example, optical hubs. Note that the foregoing minimum regenerator sections are not divided by a hub station because they are defined on a wavelength path basis. The exception is that a hub station may serve as one end point of a minimum regenerator section if it can house a regenerator.

Figure 8:
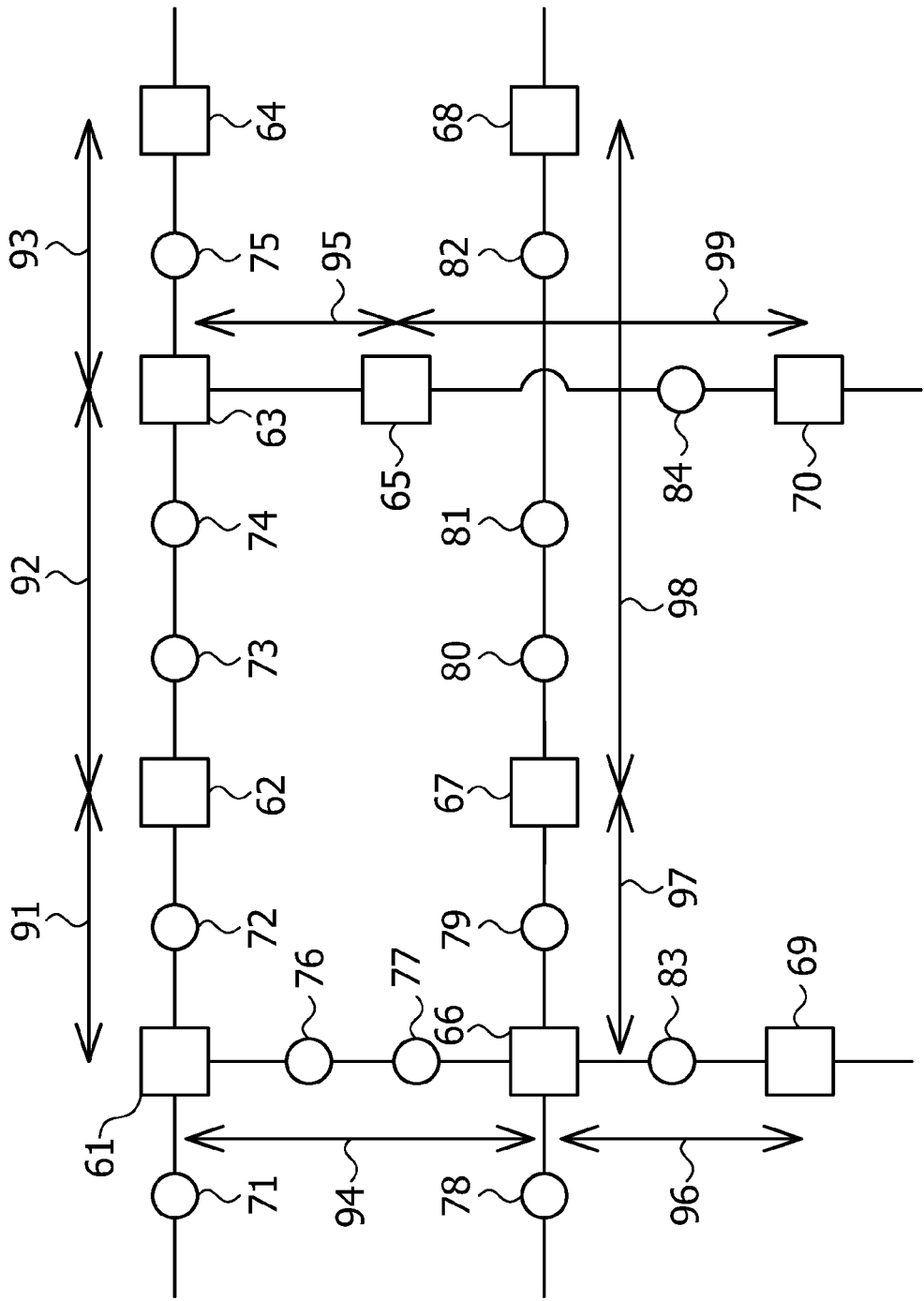
FIG. 8 illustrates unit design sections.

FIG. 8 illustrates unit design sections. Specifically, the network depicted in FIG. 8 includes the following components: optical hubs 61, 63, and 66, OADMs 62, 64, 65, and 67 to 70, and ILAs 71 to 84. The optical power level controller 25 (FIG. 4) divides the optical network at each station terminating an optical path or at each station having three or more neighboring stations, thereby forming unit design sections. Accordingly, the network of FIG. 8 is divided into nine unit design sections 91 to 99. While not indicated explicitly, the sections extending outwards from the optical hubs 61 and 66 and the OADMs 64 and 68 to 70 may also be regarded as unit design sections.

Upon division of the optical network into unit design sections, the optical power level controller 25 nominates several candidates for a new setup of optical power levels by using techniques of solving an integer programming problem, so that the signals in each unit design section can be transmitted with wavelength channels in an optimal way. For example, the optical power levels may be adjusted at individual stations to achieve optimal signal transmission of wavelength channels in a unit design section. The optical power level controller 25 thus produces several sets of specific values of optical power levels as candidates for that power level adjustment in each individual unit design section. Then from the produced candidates, the optical power level controller 25 chooses an optimal combination of optical power levels for the expanded optical network as a whole, under the constraint that none of the existing wavelength paths will be rejected as a result of the new setup of optical power levels.

The goal of the above-described optimization of optical power levels is to minimize the equipment cost of regenerators to be installed to provide new wavelength paths. That is, the optical power level controller 25 determines a specific setup of optical power levels that minimizes the cost of additional regenerators, besides enabling delivery of signals through wavelength channels.

The following mathematical expression (1) gives an objective function used to seek an optimal setup of optical power levels. Specifically, expression (1) represents the total cost of regenerators that should be newly installed to realize a specific setup of optical power levels. The optical power level controller 25 thus chooses a combination of optical power levels that will minimize the value of expression (1).

$$\sum_{d_e} a \cdot \lambda(d_e) \cdot r(d_e) \cdot x(d_e) + \sum_{d_a} \lambda(d_a) \cdot r(d_a) \cdot x(d_a) \tag{1}$$

Symbols $d_e$, and $d_a$, represent a set of existing wavelength paths (i.e., those used in the existing optical network) and a set of new wavelength paths (i.e., those to be newly added to the existing optical network), respectively. The existing wavelength paths are divided at their source and destination nodes or nodes accommodating a regenerator. For example, an existing path having no regenerators on its route will be treated as a single section, whereas an existing path having regenerators on its route will be divided at each such regenerator. New wavelength paths are each treated as a single whole section between the source and destination nodes that need a new path, rather than being divided into minimum regenerator sections. Referring again to expression (1), symbols $\lambda(d_e)$ and $\lambda(d_a)$ represent the numbers of wavelength paths $d_e$ and $d_a$, respectively. Symbols $r(d_e)$ and $r(d_a)$ represent the regenerator costs of wavelength paths $d_e$ and $d_a$, respectively. Symbols $x(d_e)$ and $x(d_a)$ are integer variables representing the numbers of regenerators contained in wavelength paths $d_e$ and $d_a$, respectively. Constant a gives more weight to the regenerator cost of the existing wavelength paths relative to that of new wavelength paths, so that a new setup of optical power levels will be determined without increasing too much the regenerator cost of the existing wavelength paths. The value of constant a may be selected in such a way that the first term of expression (1) will be hundreds to thousands times greater than the second term of the same.

The following equation (2a) and inequalities (2b) and (2c) provide constraints:

$$\sum_t T(g, t) \cdot s(t) = 1 \quad (\text{for } \forall g) \tag{2a}$$

$$\sum_t n(t) \cdot I(d, t) \cdot s(t) - N(d) \cdot x(d) \leq N(d) \quad (\text{for } \forall d = \{d_e, d_a\}) \tag{2b}$$

$$\sum_t p_i(d, t) \cdot I(d, t) \cdot s(t) - P_i(d) \cdot x(d) \leq \tag{2c}$$

$$P_i(d) \quad (\text{for } \forall d = \{d_e, d_a\}, i = 1, \ldots, M)$$

Symbol g represents a set of unit design sections, and t represents a setup of optical power levels for a unit design section. Symbol s(t) is a binary variable that takes a value of '1' when optical power level setup t is selected and '0' when that is not the case. Symbol T(g,t) is a binary parameter that takes a value of '1' when optical power level setup t is a candidate in unit design section g and '0' when that is not the case. Symbol I(d,t) is a binary parameter that takes a value of '1' when wavelength path d contains unit design section g to which the optical power level setup t belongs and '0' when that is not the case. Symbol n(t) represents the amount of noise associated with optical power level setup t. Symbol Pi(d) represents an upper limit of the i-th kind of transmission penalty in wavelength path d. Symbol N(d) represents an upper limit of the amount of noise in wavelength path d, which indicates the minimum level of optical signals that can be received. Symbol Pi(d,t) represents the amount of the i-th kind of transmission penalty in wavelength path d on the route where the optical power level setup t is applied.

The optical power level controller 25 calculates real noise values from optical power levels received from the factual data collector 26. That is, the optical power level controller 25 calculates n(t) in inequality (2b) based on the measurements of optical power levels. Also, the optical power level controller 25 receives BER of each existing wavelength path from the factual data collector 26 and calculates an upper limit of real noise values from the difference between the margin of noise levels assumed at the time of design and its corresponding factual data. That is, the optical power level controller 25 calculates N(d) in inequality (2b) based on the measurements of BER. When calculating a real margin, the optical power level controller 25 also takes other factors into account, such as the margin of age deterioration assumed at the time of design.

Equation (2a) gives a constraint used to select a set of optical power levels from among the candidates in each unit design section. Actually, one candidate is selected for each direction of signals since the optical power levels of two signal directions can be tuned independently of each other. This means that two candidates are selected for each unit design section.

Inequality (2b) gives the minimum number of regenerators required to implement an existing wavelength path or new wavelength path, based on the noise values and its upper limit N(d) on that route.

Inequality (2c) similarly gives the minimum number of regenerators required to implement an existing wavelength path or new wavelength path, but based on the amount of transmission penalty and its upper limit Pi(d) on that route. Here the term "transmission penalty" refers to, for example, the value of polarization mode dispersion, which could degrade OSNR of receive signals. Inequality (2c) may be applied to different kinds of transmission penalties, in which case there will be variations of inequality (2c) corresponding to such transmission penalties. Accordingly, inequalities (2b) and (2c) (and variations thereof) may suggest different numbers of regenerators. If this is the case, the optical power level controller 25 chooses the smallest one for the minimum number x(d) of regenerators.

The optical power level controller 25 determines optical power levels as follows. At the outset, the optical power level controller 25 produces an initial setup of optical power levels in an appropriate manner, such that signals can be delivered properly through the existing wavelength path and new wavelength path in each unit design section. For example, if the existing optical network allows a new wavelength path to be established in a certain unit design section, the existing setup of optical power levels can be used as an initial setup for that section.

The optical power level controller 25 solves the integer programming problem with the above initial setup by relaxing all integer variables in the problem into linear variables. That is, the optical power level controller 25 solves the initial setup based on a linear-relaxed version of formulas (1) and (2a) to (2c). Subsequently the optical power level controller 25 produces a new setup of optical power levels for each unit design section. More specifically, the optical power level controller 25 produces a new setup t' of optical power levels such that the reduced cost of binary variable s(t') in each unit design section g' will be a negative value. Here the reduced cost is expressed as follows:

$$-A + B \cdot n(t') + \sum_i C_i \cdot p_i(t') \quad (3)$$

where A, B, and $C_i$ are constants determined from a solution of the linear-relaxed integer programming problem. Symbol i designates a specific kind of transmission penalty. Symbol n(t') represents the amount of noise associated with a candidate t' of optical power level setup. Symbol Pi(t') represents the i-th kind of transmission penalty associated with the candidate t'.

The following expression (4) represents the reduced cost components of each optical fiber span in a unit design section.

$$B \cdot n(l, pw(l)) + \sum_i C_i \cdot p_i(l, pw(l)) \quad \text{for all } l \text{ in } t' \quad (4)$$

where l represents an optical fiber span in a unit design section and pw(l) represents an optical input power that is supplied to optical fiber span l. Symbol n(l,pw(l)) represents the total amount of noise observed at the transmitting and receiving ends of optical fiber span l when input optical power pw(l) is supplied thereto. Symbol $p_i$(l,pw(l)) represents the total amount of transmission penalties observed at the transmitting and receiving ends of optical fiber span l when input optical power pw(l) is supplied thereto.

The optical power level controller 25 determines whether the reduced cost given by expression (3) is negative when the value of expression (4) is minimum. In other words, the optical power level controller 25 determines whether the reduced cost is negative when the amount of noise and transmission penalties is minimized.

In the case where a new setup of optical power levels with a negative reduced cost has been produced in at least one unit design section, the optical power level controller 25 adds the produced setup as an additional candidate for new optical power levels and solves again the linear-relaxed integer programming problem of formulas (1) and (2a) to (2c). From that solution, the optical power level controller 25 calculates A, B, and $C_i$ in expression (3), thus producing a setup of optical power levels with a negative reduced cost of expression (3).

In the case where it is not possible to produce a new setup of optical power levels with a negative reduced cost in any of the unit design sections, the optical power level controller 25 concludes that there are no more candidates for new optical power levels. The optical power level controller 25 thus solves the integer programming problem with all candidates that have been produced up to that point, thereby determining optical power levels in each unit design section. The calculation at this time includes no linear relaxation, thus handling integer variables as they are.

Now that the optical power levels are determined, the optical power level controller 25 controls the nodes constituting the optical network such that the nodes will produce optical signals with the determined power levels. Additional regenerators may be inserted to new wavelength paths of the optical network if required to achieve the determined optical power levels. Subsequently the optical power level controller 25 examines the existing wavelength paths and new wavelength paths as to whether they can deliver signals. For a new wavelength path to which additional regenerators have been inserted, the optical power level controller 25 examines individual sections divided by those regenerators. If none of the wavelength paths fails to deliver signals, the optical power level controller 25 concludes that it is possible to expand the optical network, thus ending its processing. If there a wavelength path that cannot deliver signals properly, the optical power level controller 25 ends its processing with a conclusion that the optical network cannot be expanded.

While the above-described determination (or additional search) of optical power levels uses expressions (3) and (4), the purpose may be achieved by using other methods as will be described below.

Figure 9:
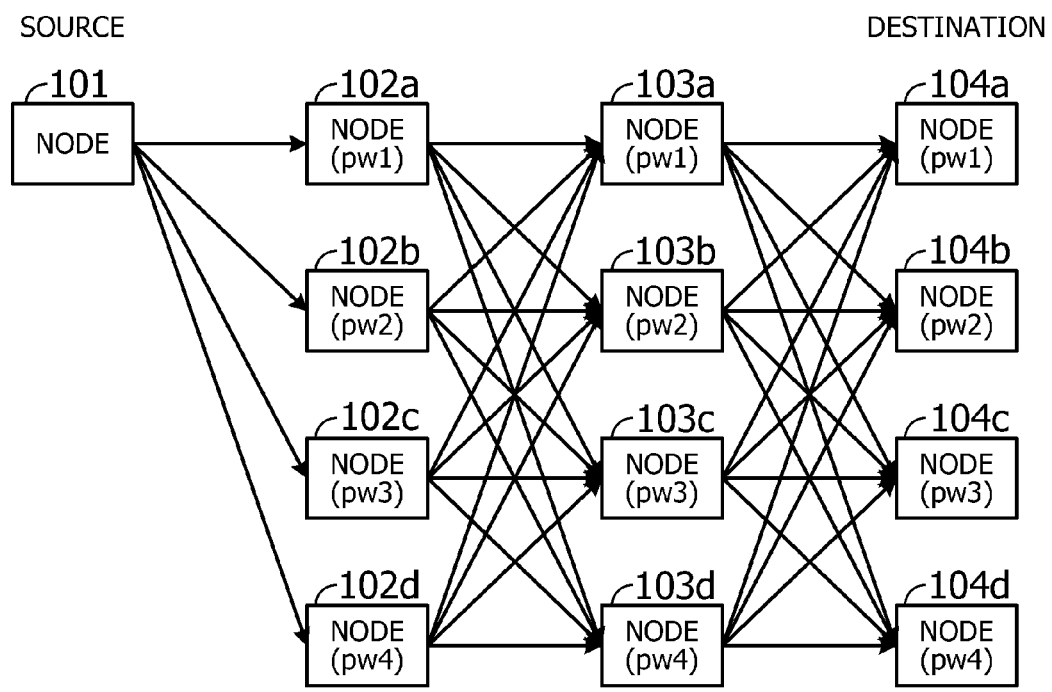
FIG. 9 illustrates an additional search that seeks a new setup of optical power levels in a unit design section containing four stations.

FIG. 9 illustrates an additional search that seeks a new setup of optical power levels in a unit design section containing four stations. Specifically, FIG. 9 depicts a plurality of nodes 101, 102a to 102d, 103a to 103d, and 104a to 104d. The boxes representing the nodes 102a to 102d, 103a to 103d, and 104a to 104d contain an indication of their respective optical power levels, which may take one of four values, pw1 to pw4. As can be seen from FIG. 9, successive three nodes 102a, 103a, and 104a have the same optical power level, pw1. Similarly, successive three nodes 102b, 103b, and 104b have the same optical power level, pw2. There are, in effect, only four stations in the network of nodes illustrated in FIG. 9.

The optical power level controller 25 assigns a link cost to each link, the link cost being a reduced cost component in the case where the optical signal output intensity at the transmitting end is selected. At each node, the optical power level controller 25 selects an optimal link from among the input links to seek a route that connects the source and destination nodes with a minimum amount of reduced cost components. As a result, a unique setup of optical power levels is determined on the route between the source node and destination node.

Selection of input links is based on the link costs, the amount of noise, and the amount of transmission penalties which are accumulated from the source node. More specifically, the optical power level controller 25 primarily selects an input link with the smallest amount of accumulated link cost. The selection of that minimum-cost input link may cause the minimum amount of noise and the minimum amount of transmission penalties between the source and destination nodes to exceed their respective upper limits. If this is the case, the optical power level controller 25 rejects that input link from the selection. In the example of FIG. 9, there are four choices (and four optical power levels) for the link selection up to the destination node. The optical power level controller 25 accumulates the link cost up to each destination link. If there is a valid route reaching either of the destination links, that link is regarded as being selectable. After selecting such routes to each destination link, the optical power level controller 25 compares their accumulated link costs to find a setup of optical power levels that is associated with the minimum-cost route. The optical power level controller 25 nominates the resulting setup of optical power levels as an additional candidate.

Figure 10:
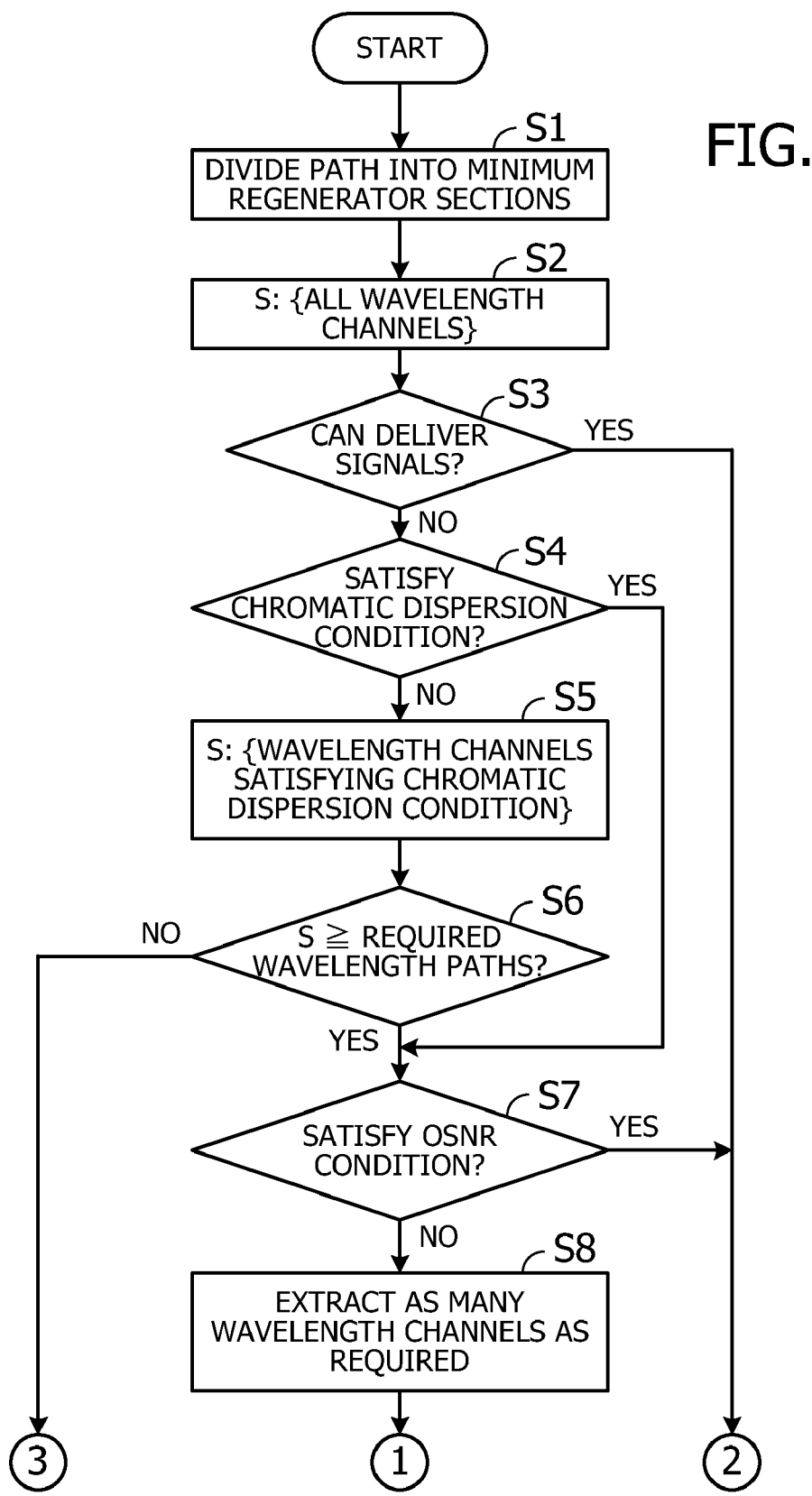
FIGS. 10 and 11 are a flowchart illustrating operation of the proposed network design apparatus.
Figure 11:
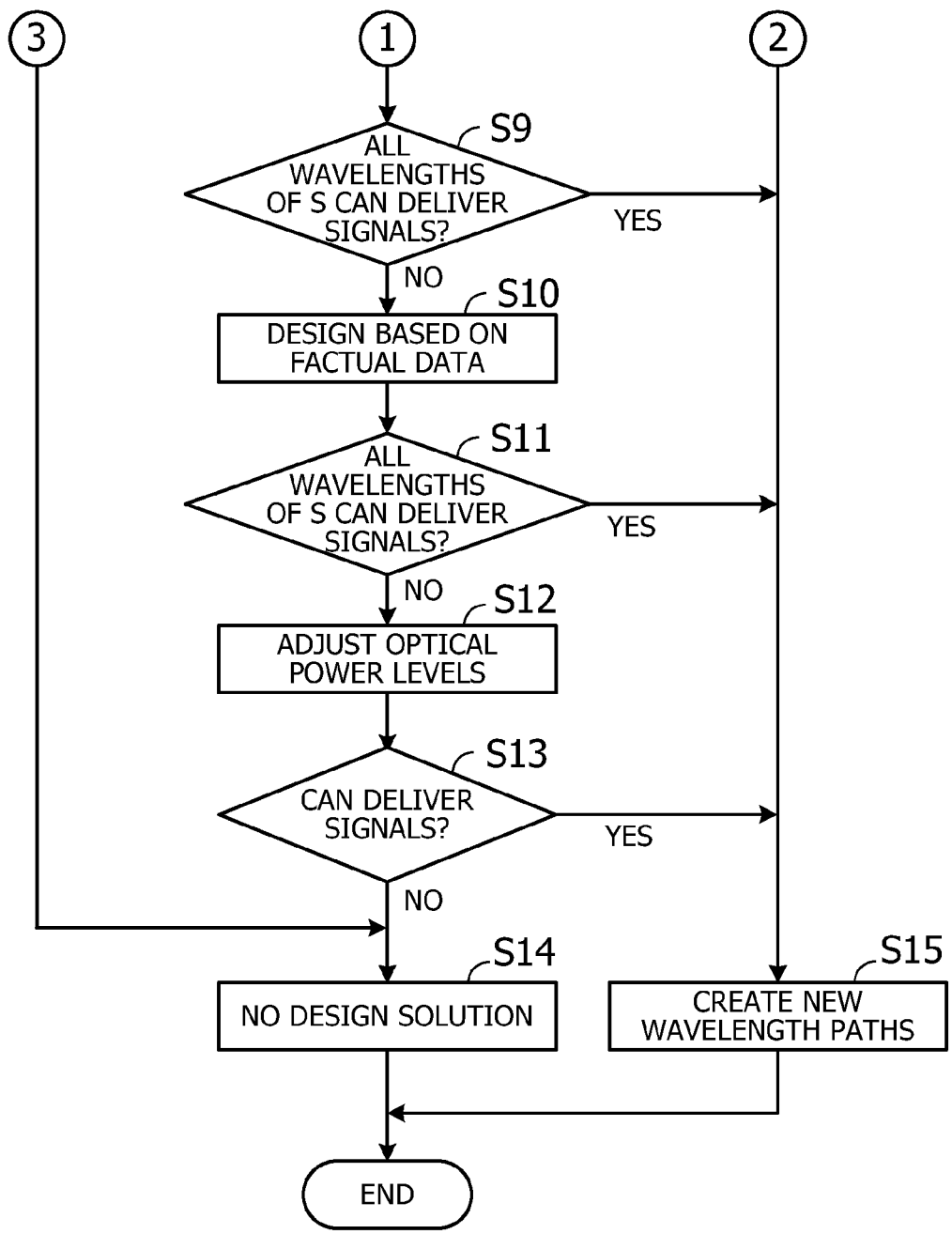

FIGS. 10 and 11 are a flowchart illustrating operation of the proposed network design apparatus. Specifically, the network design apparatus executes the following steps:

At step S1, the full channel evaluator 21 divides each new wavelength path to minimum regenerator sections.

At step S2, the full channel evaluator 21 creates a wavelength resource set S containing all wavelength channels of the WDM system. This wavelength resource set S will be used to provide the optical network with new wavelength paths.

At step S3, the full channel evaluator 21 determines, for each new wavelength path, whether the wavelength resource set S can deliver signals. That is, the full channel evaluator 21 determines, for each new wavelength path, whether all wavelength channels in each minimum regenerator section can deliver signals. If so, the full channel evaluator 21 advances to step S15. If not, the full channel evaluator 21 proceeds to step S4.

At step S4, the chromatic dispersion evaluator 22 determines, for each new wavelength path, whether the wavelength resource set S (still containing all wavelength channels) satisfies a specified condition of chromatic dispersion. If so, the chromatic dispersion evaluator 22 skips to step S7. If not, the chromatic dispersion evaluator 22 proceeds to step S5.

At step S5, the chromatic dispersion evaluator 22 extracts, for each new wavelength path, wavelength channels that satisfy the wavelength dispersion condition. The extracted wavelength channels form an updated wavelength resource set S.

At step S6, the chromatic dispersion evaluator 22 compares, for each new wavelength path, the membership of wavelength resource set S (i.e., the number of wavelength channels satisfying the chromatic dispersion condition) with the number of required wavelength paths. In other words, the chromatic dispersion evaluator 22 determines whether there exist at least as many wavelength channels satisfying the chromatic dispersion condition as required by the expanded version of the optical network. If the membership of the wavelength resource set S is equal to or larger than the number of required wavelength paths in every new wavelength paths, the chromatic dispersion evaluator 22 advances to step S7. If the membership of the wavelength resource set S is smaller than the number of required wavelength paths in either of the new wavelength paths, it is not possible to provide sufficient wavelength paths to the optical network. Accordingly, the chromatic dispersion evaluator 22 proceeds to step S14.

At step S7, the OSNR evaluator 23 determines whether all the wavelength channels contained in wavelength resource set S satisfy a specified OSNR condition. As FIG. 20 indicates, this step S7 may be reached from step S4 or step S6. In the former case, the wavelength resource set S contains the full set of wavelength channels. In the latter case, the wavelength resource set S is a subset that satisfies the chromatic dispersion condition. If all those wavelength channels contained in the wavelength resource set S satisfy the OSNR condition, the OSNR evaluator 23 advances to step S15. If not, the OSNR evaluator 23 proceeds to step S8.

At step S8, the OSNR evaluator 23 extracts, for each new wavelength path, as many wavelength channels as the number of required wavelength paths out of the wavelength resource set S, in descending order of their OSNR values. The remaining wavelength channels are removed from the wavelength resource set S. Accordingly, the resulting wavelength resource set S contains as many wavelength channels as the number of required wavelength paths. Those wavelength channels satisfy the wavelength dispersion condition, besides having relatively large OSNRs.

At step S9, the OSNR evaluator 23 determines, for each new wavelength path, whether all wavelength channels contained in the wavelength resource set S can deliver signals. More specifically, the OSNR evaluator 23 determines whether all wavelength channels contained in the wavelength resource set S satisfy the given OSNR condition. When it is found that, in either of new wavelength paths, some wavelength channels do not satisfy the OSNR condition, the OSNR evaluator 23 advances to step S10 to give them another chance based on the factual data of the optical network. When it is found that, in all new wavelength paths, all wavelength channels in the wavelength resource set S satisfy the OSNR condition the OSNR evaluator 23 proceeds to step S15.

At step S10, the measured parameter evaluator 24 collects factual data of the optical network. For example, the measured parameter evaluator 24 recalculates OSNR of the wavelength resource set S of each new wavelength path, based on the collected factual data. Here, the wavelength resource set S contains as many wavelength channels as the number of required wavelength paths, which satisfy the chromatic dispersion condition and have relatively large OSNRs.

At step S11, the measured parameter evaluator 24 determines, for each new wavelength path, whether all wavelength channels contained in the wavelength resource set S can deliver signals. More specifically, the measured parameter evaluator 24 determines whether all wavelength channels contained in the wavelength resource set S satisfy the given OSNR condition. When it is found that, in either of the new wavelength paths, some wavelength channels do not satisfy the OSNR condition, the measured parameter evaluator 24 advances to step S12 to salvage them by adjusting optical power levels. When it is found that, in all new wavelength paths, all wavelength channels in the wavelength resource set S satisfy the OSNR condition, the measured parameter evaluator 24 proceeds to step S15.

At step S12, the optical power level controller 25 solves an integer programming problem to calculate a setup of optical power levels that minimizes the regenerator cost, besides permitting all wavelength channels in the existing wavelength paths and new wavelength paths to deliver signals. At this step S12, the optical power level controller 25 handles new wavelength paths in their original form at the time when the design parameters were entered, rather than dividing them into minimum regenerator sections. Also, the optical power level controller 25 takes factual data of the optical network into consideration when it determines optical power levels.

At step S13, the optical power level controller 25 determines whether the calculated setup of optical power levels permits the existing wavelength paths and new wavelength paths to deliver signals. For the existing wavelength paths, the optical power level controller 25 only examines wavelength channels that have already been allocated. For the new wavelength paths, the optical power level controller 25 divides them again into minimum regenerator sections and examines their corresponding wavelength resource set S to determine whether they can deliver signals. When it is found that there is a wavelength path that cannot deliver signals, the optical power level controller 25 advances to step S14 since the adjustment of optical power levels does not help such wavelength channels. When it is found that the existing wavelength paths and new wavelength paths can deliver signals, the optical power level controller 25 proceeds to step S15.

At step S14, the chromatic dispersion evaluator 22 or optical power level controller 25 finds it impossible to expand the optical network, thus terminating the design process.

At step S15, the full channel evaluator 21, OSNR evaluator 23, or optical power level controller 25 adds the wavelength paths to the existing optical network, thus completing the design. In the case where this step S15 has been reached as a result of adjustment of optical power levels, that adjustment is implemented in the optical network.

Figure 12:
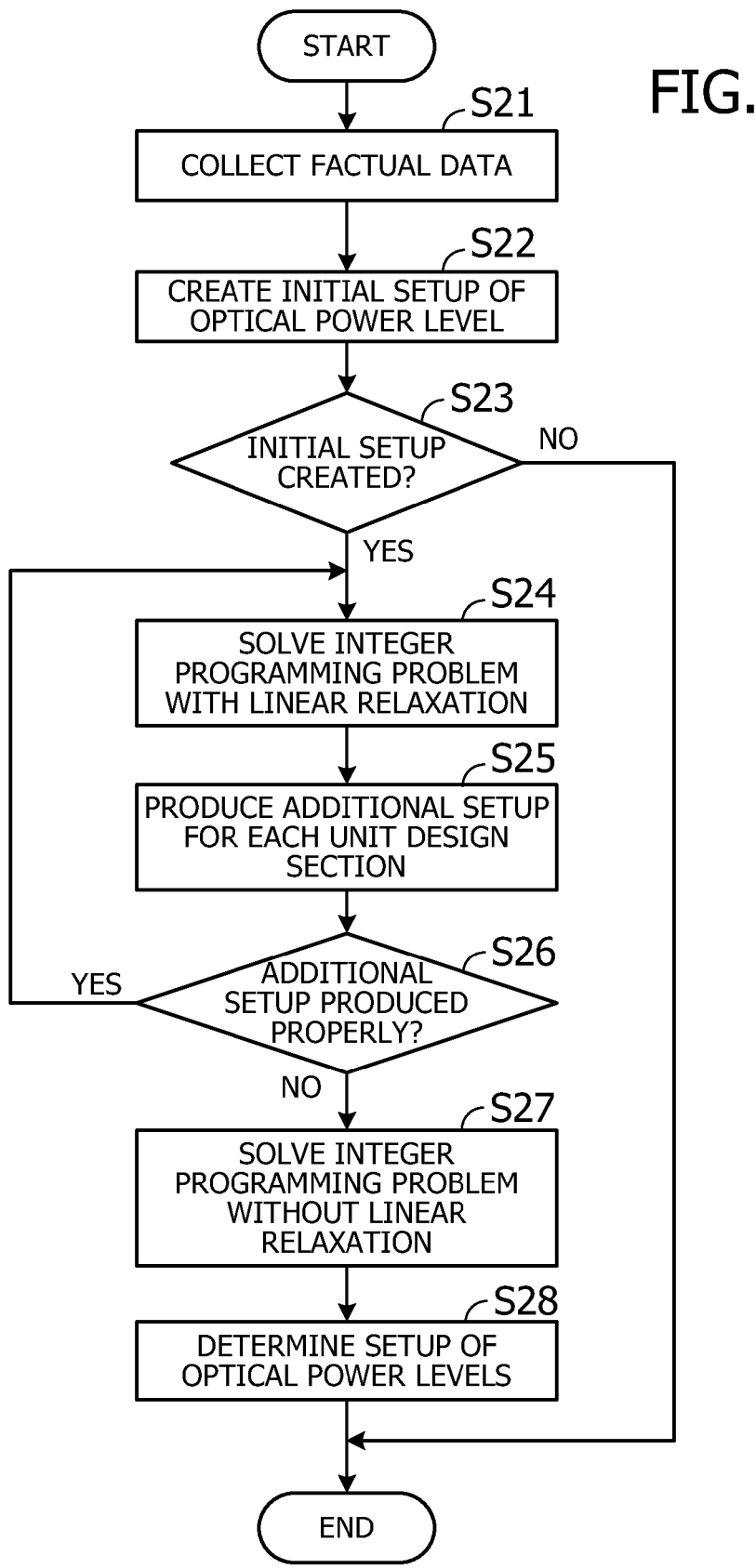
FIG. 12 is a flowchart illustrating a process of optical power level adjustment.
Figure 13:
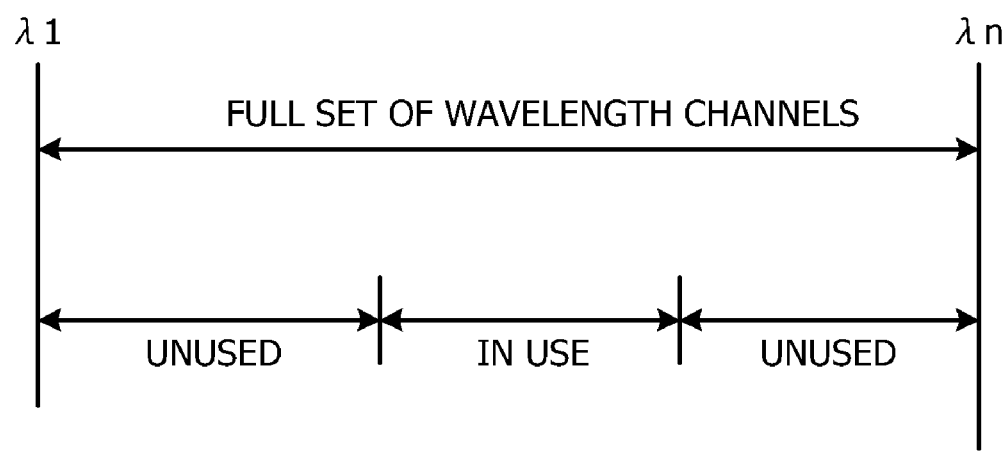
FIG. 13 illustrates determination of whether every wavelength channel can deliver signals.

FIG. 12 is a flowchart illustrating a process of optical power level adjustment. This flowchart gives details of step S12 discussed in FIG. 11 as follows:

At step S21, the optical power level controller 25 receives factual data about optical power levels and BER from the factual data collector 26.

At step S22, the optical power level controller 25 produces an initial setup of optical power levels, such that the existing wavelength paths and new wavelength paths can deliver signals in each unit design section.

At step S23, the optical power level controller 25 determines whether it has successfully produced an initial setup of optical power levels that enables the existing wavelength paths and new wavelength paths to deliver signals. If so, the optical power level controller 25 advances to step S24. If not, the optical power level controller 25 terminates the process.

At step S24, the optical power level controller 25 solves the integer programming problem given by formulas (1) and (2a) to (2c), based on the produced initial setup. Linear relaxation is used at this step to solve the problem. From the linear-relaxed integer programming solution, the optical power level controller 25 obtains the constants A, B, and $C_i$ of expression (3) representing the reduced cost in each unit design section.

At step S25, the optical power level controller 25 produces, for each unit design section, a setup of optical power levels which renders the reduced cost of expression (3) negative, besides minimizing the value of expression (4).

At step S26, the optical power level controller 25 determines whether it has successfully produced a setup of optical power levels that makes the reduced cost of expression (3) negative. If such a setup is produced in either unit design section, it means the presence of a candidate for a new setup of optical power levels optimizing the optical network. The optical power level controller 25 thus goes back to step S24. If it has failed to produce such setups in any of the unit design sections, then the optical power level controller 25 concludes that there are no more candidates and thus proceeds to step S27.

Upon returning to step S24, the optical power level controller 25 solves again the same integer programming problem with linear relaxation, but now with the setup of optical power levels produced at step S25. Then from the linear-relaxed integer programming solution, the optical power level controller 25 obtains the constants A, B, and $C_i$ of expression (3) representing the reduced cost in each unit design section. The optical power level controller 25 produces, for each unit design section, a setup of optical power levels that renders the reduced cost of expression (3) negative, besides minimizing the value of expression (4). The optical power level controller 25 repeats steps S24 to S26 to produce various setups of optical power levels, as long as the reduced cost of expression (3) is negative in either of the unit design sections.

At step S27, the optical power level controller 25 solves the integer programming problem without linear relaxation and selects one of the calculated candidates of optical power levels in each unit design section that minimizes the objective function given by expression (1).

At step S28, the optical power level controller 25 configures the nodes constituting the optical network such that the nodes will produce optical signals at the determined power levels. The optical power level controller 25 may insert additional regenerators to new wavelength paths of the optical network if required to achieve the determined optical power levels. Upon completion of step S28, the control is returned to step S11 of FIG. 11 so as to determine whether to apply the setup of optical power levels to the optical network.

As can be seen from the above description, the proposed network design apparatus 11 determines whether there are a specified number of wavelength channels that satisfy a chromatic dispersion condition, when it is found that not all wavelength channels can deliver signals. Then, out of the wavelength channels satisfying the chromatic dispersion condition, the network design apparatus 11 extracts as many wavelength channels as the number of required optical paths in descending order of OSNR. The network design apparatus 11 determines whether the extracted wavelength channels satisfy an OSNR condition, thus identifying wavelength channels satisfying both the chromatic dispersion condition and OSNR condition. Such wavelength channels, if present, make it possible to add new wavelength paths to the existing optical network, even though not all wavelength channels can be used.

The number of wavelength channels satisfying both conditions may be insufficient to implement all required wavelength paths. If that is the case, the proposed network design apparatus 11 uses factual data to relax previously entered design parameters, in the hope that more wavelength channels can be discovered. That is, the network design apparatus 11 provides the existing optical network with as many additional wavelength paths as possible.

In the case where no additional wavelength channels are found in spite of the parameter relaxation, the proposed network design apparatus 11 may adjust optical power levels at the nodes constituting the optical network. The network design apparatus 11 thus provides the existing optical network with as many additional wavelength paths as possible.

Further, the proposed network design apparatus 11 determines optical power levels based on an integer programming problem. The network design apparatus 11 can therefore design an optical network without increasing too much the cost of regenerators which may be required to implement new wavelength paths.

The network design apparatus 11 may apply some factual data of optical power levels or BER to the integer programming problem. This feature makes it possible to provide an existing optical network with as many additional wavelength paths as possible.

While the above description has assumed that the measured parameter evaluator 24 updates parameters representing signal loss in optical fiber spans according to the actual optical power levels, the present invention is not limited to that configuration. The measured parameter evaluator 24 may be configured to change the OSNR threshold based on the actual noise level of the optical network which can be calculated from measurements of BER. The measured parameter evaluator 24 may also add some margin to the OSNR threshold, so as to provide an existing optical network with as many additional wavelength paths as possible.

While the above embodiment uses three constraints (2a) to (2c), the proposed network design apparatus 11 may be configured to use the first two constraints (2a) and (2b) only. In this case, the third constraint (2c) related to transmission penalties may be added as an optional constraint to provide a more noise-tolerant optical network.

According to an embodiment, there is provided a program code for execution by a computer. The program describes what the computer is supposed to do to provide the above-described processing functions. The program may be stored in a computer-readable storage medium for the purpose of storage and distribution. Suitable computer-readable storage media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include, for example, digital versatile discs (DVD), DVD-RAM, compact disc read-only memory (CD-ROM), CD-Recordable (CD-R), and CD-Rewritable (CD-RW). Magneto-optical storage media include magneto-optical discs (MO), for example.

To execute a program, a computer stores necessary software components in its local storage unit, which may have previously been installed from a portable storage media or downloaded from a server computer. The computer executes the program read out of the local storage unit, thereby performing the programmed functions. Where appropriate, the computer may immediately execute program codes read out of the portable storage medium, without installing them in its local storage device. Another alternative method is that the user computer dynamically downloads programs from a server computer when they are demanded and executes them upon delivery.

The proposed network design apparatus and network design method offer a solution to add wavelength paths to an existing network even in the case where not all wavelength channels can deliver signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions, and alterations could be made hereto without departing from the spirit and scope of the invention.

What is claimed is:

1. A network design apparatus to add new wavelength paths to an existing optical network, the network design apparatus comprising:
   a full channel evaluator to determine whether all wavelength channels for main signals can deliver the main signals of the optical network;
   a chromatic dispersion evaluator to determine whether there are a specified number of wavelength channels that satisfy a specified chromatic dispersion condition, when it is found that one or more wavelength channels cannot deliver main signals; and
   an optical signal-to-noise ratio (SNR) evaluator to extract a specified number of wavelength channels out of those satisfying the chromatic dispersion condition in descending order of optical SNRs thereof, and to determine whether the extracted wavelength channels satisfy a specified optical SNR condition.

2. The network design apparatus according to claim 1, further comprising:
   a factual data collector to collect factual data of the optical network from nodes constituting the optical network; and
   a measured parameter evaluator to update previously given design parameters with the collected factual data when the optical SNR evaluator has determined that not all of the extracted wavelength channels for main signals satisfy the optical SNR condition, and determine again whether all the extracted wavelength channels for main signals satisfy the optical SNR condition, based on the updated design parameters.

3. The network design apparatus according to claim 2, further comprising an optical power level controller to adjust optical power levels of the optical network when the measured parameter evaluator has determined that one or more of the extracted wavelength channels do not satisfy the optical SNR condition.

4. The network design apparatus according to claim 3, wherein the optical power level controller divides the optical network into unit design sections which are delimited by terminating stations of a wavelength path or by stations each having at least three neighboring stations, produces candidates for optical power levels in each of the unit design sections, and selects from the candidates a combination of optical power levels which permits all the existing wavelength path and new wavelength path to deliver signals.

5. The network design apparatus according to claim 4, wherein the optical power level controller determines a combination of optical power levels by solving an integer programming problem.

6. The network design apparatus according to claim 5, wherein the integer programming problem comprises:
   an objective function to minimize a cost of optical regenerators to be inserted to the optical network;
   a constraint on selection of one of the candidates of optical power levels in each of the unit design sections; and
   a constraint on determination of how many optical regenerators to insert, which includes a threshold for evaluating noise levels of the existing wavelength paths and new wavelength paths.

7. The network design apparatus according to claim 6, wherein the integer programming problem further comprises yet another constraint on the determination of how many optical regenerators to insert, which includes a threshold for evaluating transmission penalties of the existing wavelength paths and new wavelength paths.

8. The network design apparatus according to claim 6, wherein:
   the factual data includes measurements of optical power levels; and
   the optical power level controller calculates the noise levels based on the measurements of optical power levels for use in solving the integer programming problem.

9. The network design apparatus according to claim 6, wherein:
   the factual data includes measurements of bit error rates; and
   the optical power level controller calculates the threshold based on the measurements of bit error rates for use in solving the integer programming problem.

10. The network design apparatus according to claim 2, wherein:
    the factual data includes measurements of optical power levels; and
    the measured parameter evaluator calculates a loss of optical fiber spans of the optical network from the measurements of optical power levels and updates parameters representing the loss of optical fiber spans with the calculated loss.

11. The network design apparatus according to claim 2, wherein:
    the factual data includes measurements of bit error rates; and
    the measured parameter evaluator calculates a new threshold of the optical SNR from the measurements of bit error rates and updates an existing threshold of the optical SNR with the new threshold.

12. A method executed by a network design apparatus to add new wavelength paths to an existing optical network, the method comprising:
    determining whether all wavelength channels for main signals can deliver the main signals of the optical network;
    determining whether there are a specified number of wavelength channels that satisfy a specified chromatic dispersion condition, when it is found that one or more wavelength channels cannot deliver main signals;

extracting a specified number of wavelength channels out of those satisfying the chromatic dispersion condition in descending order of optical SNRs thereof; and determining whether the extracted wavelength channels for main signal satisfy a specified condition of optical signal-to-noise ratios.

13. A computer-readable storage medium storing a network design program to add new wavelength paths to an existing optical network, the network design program, when executed by a computer, causing the computer to perform a method comprising:

determining whether all wavelength channels for main signals can deliver the main signals of the optical network;

determining whether there are a specified number of wavelength channels that satisfy a specified chromatic dispersion condition, when it is found that one or more wavelength channels cannot deliver main signals;

extracting a specified number of wavelength channels out of those satisfying the chromatic dispersion condition in descending order of optical SNRs thereof; and determining whether the extracted wavelength channels for main signals satisfy a specified condition of optical signal-to-noise ratios.

* * * * *